Patented June 20, 1933

1,914,441

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND FIBER DYED THEREWITH

No Drawing. Application filed August 17, 1931, Serial No. 557,724, and in Germany August 19, 1930.

Our present invention relates to new azo dyestuffs insoluble in water and to fiber dyed therewith.

These dyestuffs correspond probably to the general formula:

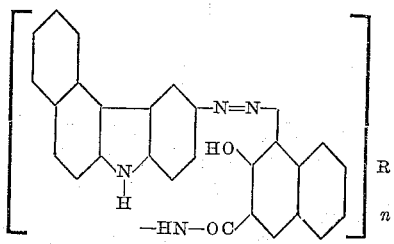

wherein R means an aromatic radical of the benzene, naphthalene, anthracene, acenaphthene, carbazole and quinoline series which radical may contain alkyl, alkoxy, halogen, nitro-, phenylamino-carbonyl ($C_6H_5$—NHCO—), alkyl-sulfonyl- or di-alkylamino-sulfonyl-groups

and n means the number 1 or 2.

They are prepared by diazotizing monoamino-5.6-benzo-carbazole (described in Berichte der deutschen chemischen Gesellschaft, vol. 46, page 3723) and combining the diazo compound thus formed with a 2-hydroxy-naphthalene-3-carbonyl-amino-aryl (wherein aryl means the aromatic radical signified in the above formula by R) or a corresponding di(2-hydroxy-naphthalene-3-carbonyl-amino)-aryl.

The monoamino-5.6-benzo-carbazole used as diazo-component in the production of our new dyestuffs has, according to the above reference, the constitution of 3-amino-5.6-benzo-carbazole. Throughout this specification and the claims we use this alleged constitution. As, however, no proof for this assumption is given in the said reference and we do not know any argument warranting it, we use it without guaranty and write therefore "(3)-amino-5.6-benzo-carbazole" and give the structural formulæ as "probably" corresponding to our dyestuffs.

The dyestuffs may be produced in substance and used for making color lakes; or they may be prepared on fibers. As fibers suitable for the production of these dyestuffs thereon may be named: animal fibers (wool, silk), native cellulose (cotton), regenerated cellulose (viscose).

The dyeings and printings thus obtained on fibers show dark blue shades and are distinguished by a very good fastness to chlorine.

In order to further illustrate our invention, the following examples are given; we wish it however to be understood that we are not limited to the particular products or reaction conditions mentioned therein:

Example 1

Well boiled and dried cotton yarn is impregnated with a solution containing per liter 4 grs. of 1-(2-hydroxy-naphthalene-3-carbonyl)-amino-naphthalene, 12 c.c. of caustic soda solution of 34° Bé. and 10 c.c. of Turkey red oil. The goods are well wrung out, developed in a solution containing per liter the diazo compound of 2.3 grs. of (3)-amino-5.6-benzo-carbazole and being neutralized with sodium bicarbonate, rinsed and soaped.

In this manner a reddish dark blue dyeing, of a very good fastness to chlorine and to boiling is obtained. The dyestuff thus produced on the fiber corresponds probably to the following formula:

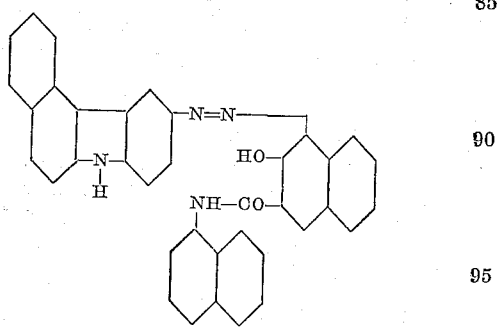

Example 2

Cotton yarn, previously treated in a suitable manner, is impregnated with a solution containing per liter 5.5 grs. of 1-(2-hydroxy-naphthalene-3-carbonyl)-amino-3-methyl-4-methoxybenzene, 11 c.c. of caustic soda solution of 34° Bé. and 10 c.c. of Turkey red oil. The goods are well dehydrated and developed in a solution which contains per liter the diazo compound of 2.3 grs. of (3)-amino-5.6-benzo-carbazole. After finishing in the usual manner a dark blue dyeing of a very good fastness to chlorine and to boiling is obtained.

The dyestuff thus produced on the fiber corresponds probably to the formula:

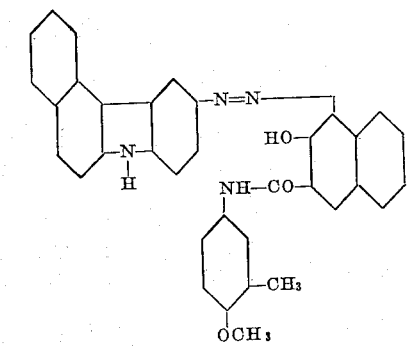

The following table shows the shades of some other combinations of this type:

The same diazo compound yields on cotton with the (2 - hydroxy - naphthalene - 3 - carbonyl)—compound of:

|  | Shades |
|---|---|
| -Amino-benzene | Reddish dark blue |
| -2-amino-naphthalene | Blackish blue |
| -1-amino-2-methyl-benzene | Reddish dark blue |
| -1-amino-4-chloro-benzene | Dark blue |
| -1-amino-2-methyl-5-chloro-benzene | Greenish dark blue |
| -1-amino-4-chloro-2.5-dimethoxy-benzene | Dark blue |
| -1-amino-2-methoxy-benzene | Reddish dark blue |
| -1-amino-2-ethoxy-benzene | Dark blue |
| -1-amino-3-chloro-benzene | Reddish dark blue |
| -1-amino-2.5-dimethoxy-benzene | Dark blue |
| -1-amino-2-methoxy-4-chloro-benzene | Do. |
| -1-amino-2-methyl-4-chloro-benzene | Do. |
| -1-amino-4-methoxy-naphthalene | Do. |
| -1-amino-3-chloro-2.4-dimethoxy-benzene | Do. |
| -1-amino-4-bromo-2.5-dimethoxy-benzene | Do. |
| -1-amino-3-methoxy-naphthalene | Do. |
| -2-amino-3-methoxy-naphthalene | Reddish dark blue |
| -4 amino-acenaphthene | Dark blue |
| -2-amino-carbazole | Greyish blue |
| -2-amino-anthracene | Greenish blue |
| -(3'-amino-benzoyl-amino)-benzene | Reddish blue |
| -1-amino-3.4-dichloro-benzene | Navy blue |
| -6-amino-2-methyl-quinoline | Greenish blue |
| -1-amino-3-(dimethyl-amino-sulfonyl)-benzene | Do. |
| -1-amino-2-methyl-5-(ethyl-sulfonyl)-benzene | Do. |

Example 3

A solution containing 4 grs. of 1-(2-hydroxy - naphthalene-3-carbonyl) - amino - 4-methoxy-benzene, 12 c.c. of caustic soda solution of 34° Bé., 20 c.c. of Turkey red oil and one of the usual silk-protecting agents, for instance sulfite-cellulose waste liquor, is made up to 1 liter.

In this padding solution a silk hank is impregnated at 25° C. for 15 minutes. Then the bath is mixed with 10 grs. of common salt. The hank is again handled for a quarter of an hour and then well dehydrated.

The hank thus impregnated is developed in a solution which contains per liter the diazo compound of 2.3 grs. of (3)-amino-5.6-benzo-carbazole and which is neutralized with sodium acetate and then mixed with 5 c.c. of an acetic acid of 50% strength and 10 grs. of common salt per liter. After rinsing and soaping a blue dyeing is obtained.

The dyestuff thus produced on the fiber corresponds probably to the formula:

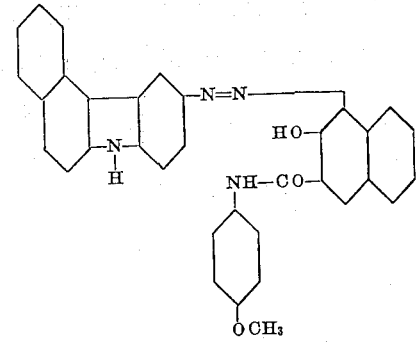

The same diazo compound yields with 4.4'-di-(2-hydroxy - naphthalene-3-carbonyl-amino)-3.3'-dimethoxy-diphenyl a reddish blue dyeing.

On wool, the same diazo compound yields with 2-(2-hydroxy-naphthalene-3-carbonyl)-amino-naphthalene a greyish blue dyeing.

Example 4

Viscose is impregnated in a bath containing per liter 3 grs. of 1-(2-hydroxy-naphthalene-3-carbonyl)-amino-3-nitro-benzene, 6 c.c. of caustic soda solution of 34° Bé. and 20 c.c. of Turkey red oil. After half an hour the goods are well centrifuged and developed in a solution which contains per liter the diazo compound of 2.3 grs. of (3)-amino-5.6-benzo-carbazole and whereof the excess of mineral acid is neutralized with sodium acetate. After rinsing and soaping a greenish blue dyeing is obtained.

The dyestuff thus produced on the fiber corresponds probably to the formula:

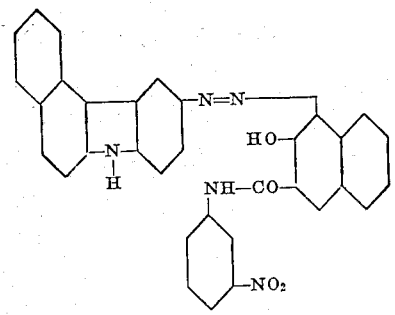

The same diazo compound yields with 1-(2-hydroxy-naphthalene-3-carbonyl)-amino-naphthalene a reddish blue dyeing.

We claim:

1. As new compounds the azodyestuffs corresponding probably to the general formula:

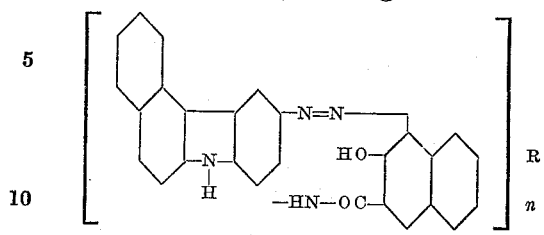

wherein R means an aromatic radical of the benzene, naphthalene, anthracene, acenaphthene, carbazole and quinoline series which radical may contain alkyl, alkoxy, halogen, nitro-, phenylamino-carbonyl-, alkyl-sulfonyl- or dialkylamino-sulfonyl-groups and $n$ means the number 1 or 2, which compounds are insoluble in water and yield when produced on fibers dark blue shades of a good fastness to chlorine.

2. As new compounds the azodyestuffs corresponding probably to the general formula:

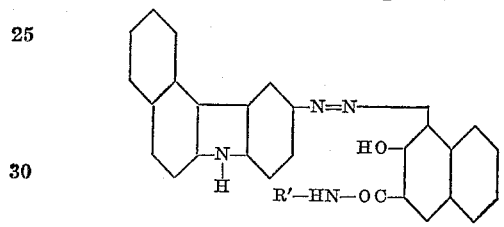

wherein R' means a benzene radical which may be substituted by alkyl, alkoxy, halogen, nitro-, phenylamino-carbonyl-, alkyl-sulfonyl-, or dialkylamino-sulfonyl-groups.

3. As a new compound the azodyestuff corresponding probably to the formula:

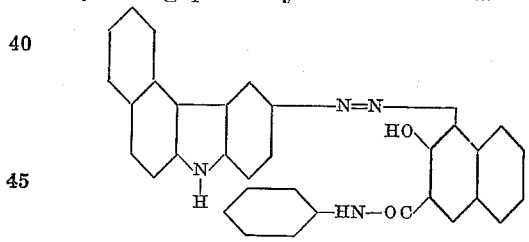

which compound is insoluble in water and yields when produced on fibers reddish dark blue shades of a good fastness to chlorine.

4. As a new compound the azodyestuff corresponding probably to the formula:

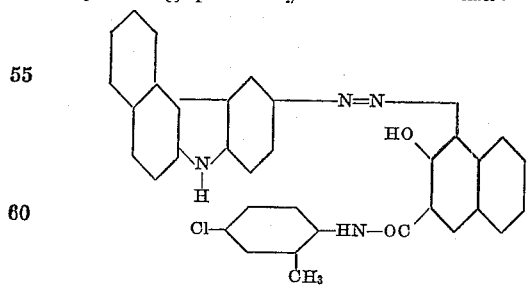

which compound is insoluble in water and yields when produced on fibers dark blue shades of a good fastness to chlorine.

5. Fiber dyed with the azodyestuffs as claimed in claim 1.
6. Fiber dyed with the azodyestuffs as claimed in claim 2.
7. Fiber dyed with the azodyestuff as claimed in claim 3.
8. Fiber dyed with the azodyestuff as claimed in claim 4.

In testimony whereof we affix our signatures.

LEOPOLD LASKA.
ARTHUR ZITSCHER.